UNITED STATES PATENT OFFICE.

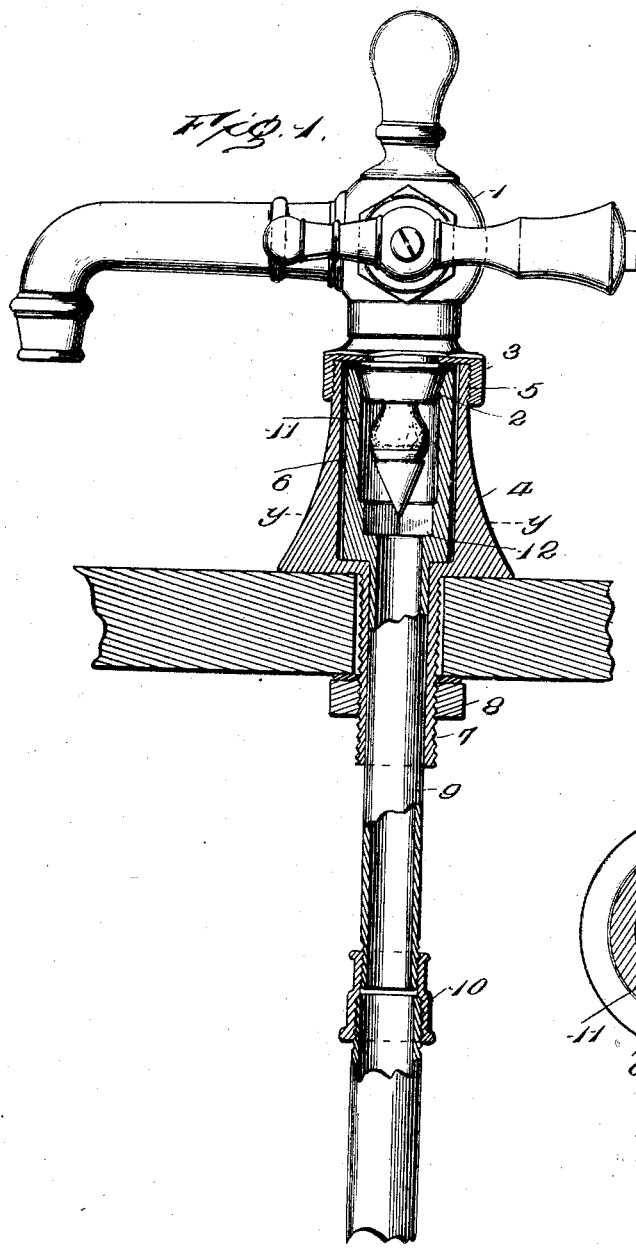

ARTHUR PICKLES, OF JACKSON, MICHIGAN.

BASIN-FAUCET.

No. 893,365.          Specification of Letters Patent.          Patented July 14, 1908.

Application filed June 22, 1907. Serial No. 380,317.

To all whom it may concern:

Be it known that I, ARTHUR PICKLES, citizen of the United States, residing at Jackson, in the county of Jackson and State of Michigan, have invented certain new and useful Improvements in Basin-Faucets, of which the following is a specification.

The present invention relates to improvements in basin faucets, and more particularly to a novel means for securing the faucet to the slab or other support.

The object of the invention is to so design the base of the faucet that the tail-pipe can be detached from the supply pipe by an operator working above the slab, thereby obviating the necessity of employing a wrench in the small space usually found between the basin and the walls to which the slab is secured.

For a full description of the invention and the merits thereof and also to acquire a knowledge of the details of construction and the means for effecting the result, reference is to be had to the following description and accompanying drawings, in which:

Figure 1 is a side elevation of a basin faucet embodying the invention, portions being shown in section. Fig. 2 is a sectional view on the line $y$—$y$ of Fig. 1.

Corresponding and like parts are referred to in the following description and indicated in all the views of the drawings by the same reference characters.

The invention may be employed in connection with any of the conventional types of basin faucets such as indicated at 1, the lower end of the faucet being tapered at 2 and provided with a coupling nut 3 of the usual construction. The base 4 is similar in contour to those commonly in use, the lower portion thereof being flared outwardly while the upper portion is exteriorly threaded at 5 for engagement with the coupling nut 3.

A chamber 6 is formed within the base 4, the said chamber being shown as cylindrical in shape and communicating at its lower end with a passage extending through a sleeve 7 rigid with and projecting from the lower face of the base 4. This sleeve 7 is designed to extend through an opening in the slab to which the faucet is applied, and is exteriorly threaded for the reception of a clamping nut 8 designed to be turned tightly against the lower face of the slab for the purpose of rigidly securing the base 4 thereto. Fitting loosely within the sleeve 7 is a tail pipe 9 having the lower end thereof threaded for engagement with the coupling sleeve 10 while the upper end is formed with an enlargement 11 received within the chamber 6 of the base. In the present instance this enlargement is cylindrical in shape, corresponding to the chamber 6, and the inner walls of the enlargement 11 are flared outwardly at the upper end to receive the tapered end 2 of the faucet.

It will thus be readily apparent that by screwing the coupling nut 3 tightly upon the threaded upper end 5 of the base 4 the tapered end 2 of the faucet will be forced within the flared mouth of the enlargement 11 and a water tight joint between the two members will thereby be obtained. At the base of the opening within the enlargement 11 an angular or square socket 12 is formed, the said socket being designed to be engaged by a suitable tool whereby the tail pipe 9 can be rotated by an operator working above the slab upon which the faucet is mounted. When it is desired to disengage the tail pipe 9 from the supply pipe the coupling nut 3 is unscrewed and the faucet 1 removed from the base. A suitable tool is then inserted in the socket 12 and the tail pipe 9 screwed out of engagement with the coupling sleeve 10. The said tail pipe may then be readily removed from position. Attention is directed to the fact that this invention entirely eliminates both the slip joint and the ground joint which are commonly employed in structures of this character and enables the faucets to be removed from or placed in position with a comparatively small amount of trouble.

Having thus described the invention, what is claimed as new is:

1. The combination of a faucet, a base having a chamber therein, and a tail pipe formed with an enlargement received loosely within the chamber and engaging the faucet, the said enlargement being provided with means for engagement by a tool for rotating the tail piece for the purpose specified.

2. The combination of a faucet, a base having a chamber formed therein, and a tail pipe formed with an enlargement received within the chamber and engaging the lower end of the faucet, a socket being formed at the base of the said enlargement for the purpose specified.

3. The combination of a faucet, a coupling nut carried by the faucet, a base having a chamber therein, and a tail pipe formed with an enlargement received within the chamber and engaging the faucet, the before mentioned coupling nut coöperating with the base to clamp the end of the faucet securely against the mouth of the enlargement and the said enlargement being provided with means for engagement by a tool for rotating the tail piece for the purpose specified.

4. The combination of a faucet having the coupling end thereof tapered, a base formed with a cylindrical chamber, a tail pipe provided at one end with a cylindrical enlargement designed to be received loosely within the chamber in the base, the mouth of the enlargement receiving the tapered end of the faucet, and means for securing the faucet to the base, an angular opening being provided at the base of the enlargement for the purpose specified.

5. The combination of a faucet having the coupling end thereof tapered, a base formed with a chamber, a sleeve extending from the lower face of the base and communicating with the chamber, a tail pipe fitting loosely within the sleeve and formed at one end with an enlargement designed to be received within the chamber of the base, the said enlargement having a flared mouth and also having a socket formed therein, and a coupling nut carried by the faucet and engaging the base to hold the tapered end of the faucet securely in engagement with the flared mouth of the enlargement.

In testimony whereof I affix my signature in presence of two witnesses.

ARTHUR PICKLES. [L. S.]

Witnesses:
C. T. SEWARD,
CLAUDE C. DEWEY.